United States Patent [19]

Gerüm et al.

[11] Patent Number: 4,465,608
[45] Date of Patent: Aug. 14, 1984

[54] PROCESS FOR THE PRODUCTION OF MAGNETIC DISPERSIONS CONTAINING BINDERS

[75] Inventors: Johannes Gerüm, Unterpfaffenhofen-Germering; Burkhard Nippe, Munich; Heinrich Kober, Hohenschaeftlarn; Robert Kohler, Wessling, all of Fed. Rep. of Germany

[73] Assignee: Agfa-Gevaert Aktiengesellschaft, Leverkusen, Fed. Rep. of Germany

[21] Appl. No.: 391,504

[22] Filed: Jun. 24, 1982

[30] Foreign Application Priority Data

Jun. 30, 1981 [DE] Fed. Rep. of Germany ....... 3125567

[51] Int. Cl.$^3$ .................. C04B 35/04; H01F 1/00
[52] U.S. Cl. .................. 252/62.54; 427/128; 428/412; 428/413; 428/900; 428/425.9; 428/694
[58] Field of Search ...................................... 252/62.54

[56] References Cited

U.S. PATENT DOCUMENTS 4,107,385 8/1978 Higuehi et al. .................. 428/412
4,220,698 9/1980 Brynko et al. .................. 430/109
4,285,825 8/1981 Isobe et al. .................. 252/62.54
4,334,887 6/1982 Frank et al. .................. 252/62.54 X

FOREIGN PATENT DOCUMENTS 2341168 2/1974 Fed. Rep. of Germany ...... 428/412
1415949 12/1975 United Kingdom .
1416618 12/1975 United Kingdom .

Primary Examiner—Arthur P. Demers
Attorney, Agent, or Firm—Connolly and Hutz

[57] ABSTRACT

This invention relates to the addition of organic boron compounds, prepared by either reacting boric acid with polyhydric alcohols having a total of 5 or more neighbouring OH groups per boron atom and then with polyethylene oxide in a mol ratio of 1:40, based on 1 mol of borate which is obtained, and with a carboxylic acid having from 8 to 22 carbon atoms or reacting boric acid first with polyhydric alcohols having a total of 5 to 11 neighbouring OH groups per boron atoms, and the with a carboxylic acid having from 8 to 22 carbon atoms, said boron compound being added, in a quantity of from 3 to 12, in particular from 3 to 6 parts, by weight, based on 100 parts, by weight, of magnetic pigments, and in particular of metal powders, to the grinding operation of the magnetic pigment dispersion and then processing in a known manner. The necessary degree of dispersion is achieved after a short grinding time compared to known dispersing agents, during which time the pigment particles which are initially lying together are separated into monodisperse individual particles. The favorable effect is expressed by improved alignment values in the finished magnetic tape.

11 Claims, No Drawings

PROCESS FOR THE PRODUCTION OF MAGNETIC DISPERSIONS CONTAINING BINDERS

This invention relates to a process for the dispersion of acicular, ferromagnetic pigments for magnetic tapes using organic boron compounds as dispersing agents.

It is known that the recording quality of a magnetic storage medium is essentially determined by the quality of the dispersion of the magnetic particles in the magnetic lacquer.

For dispersing magnetic particles, surface-active substances are usually used, depending on the surface charge of the pigment, as an anionic, cationic, ampho-teric or non-ionic compound. An optimum dispersing effect is only achieved when the particles to be dispersed are irreversibly covered with a unimolecular layer of the surface-active substance, which prevents the agglomeration of the pigment needles. The surface-active substances which have hitherto been used, for example, lecithin, do not fully meet these requirements, so that, on the one hand, substances which are not bound sufficiently firmly to the surface of the particles diffuse into the layer and result in undesirable smearing effects of the magnetic material, or, on the other hand, a quantity of pigment agglomerations always remains which disadvantageously influences the electroacoustic values of the magnetic recording medium, in particular the noise characteristics.

The problem of an irreversible separation of the individual needles by surface-active substances becomes particularly apparent when using acicular iron particles as a magnetization carrier. Due to the clearly higher magnetization density of the metal particles compared to iron oxides or chromium oxides which have hitherto been used, the attractive forces between the individual particles are substantially more difficult to overcome, which may be observed in an accelerated agglomeration of the metal particles after being dispersed. Thus, the necessary degree of dispersion in particular with metal particles may not always be achieved by using conventional surface-active substances. This results in a clumping of the particles in the magnetic lacquer and in deficient lacquer stability, and is evident on the surface of the magnetic layer by a pronounced grooved structure and by impaired electro-acoustic characteristics.

Thus, an object of the present invention is to provide a magnetic lacquer by using suitable surface-active substances which allow the necessary degree of dispersion even when metal powder pigments are used.

This object is achieved according to the present invention in that an organic boron compound, prepared by eacting boric acid with one or more polyhydric alcohols having a total of at least five vicinal OH-groups per boron atom and then with polyethylene oxide in a mol ratio of 1:4, based on 1 mol of borate which is obtained, and/or with a carboxylic acid having from 8 to 22 carbon atoms, is added to the magnetic dispersion in a quantity of from 3 to 12 parts, by weight, based on 100 parts by weight of magnetic pigments, then ground and mixed in a known manner with polymeric binders.

The necessary degree of dispersion is obtained after a short grinding time during which the pigment particles which are initially lying together are separated into monodisperse individual particles. The viscosity which is obtained during this procedure is maintained over a long time interval and no freely moving portions of the dispersing agent according to the present invention remain in the finished magnetic tape. A decisive feature of the process according to the present invention is the fact that the dispersing agent is already added to the grinding operation. If other known dispersing agents or the compounds according to the present invention are added after grinding process is finished or before the dispersion is coated onto a substrate, for example, as in German Offenlegungsschrift No. 2 341 168, then the above-mentioned advantages are not obtained. Although a favourable degree of dispersion is achieved for all magnetic pigments, this applies in particular to magnetic metal powders, such as Fe and alloys thereof.

The organic boron compounds which are preferably used as a dispersing agent for magnetic lacquers are those which contain a mono- or di-ester of a carboxylic acid having from 8 to 22 carbon atoms and those which contain polyethylene oxide alone and/or a mono- or di-ester of a fatty acid.

The organic boron compounds are added to the grinding operation in a quantity of from 3 to 12 parts, by weight, preferably from 3 to 6 parts, by weight per 100 parts, by weight, of the magnetic pigments.

The compounds which are used as dispersing agents are prepared as described, for example, in U.S. Pat. No. 3,852,314 and in British Pat. No. 1 295 877 (French Pat. No. 2 025 541).

The boron compounds are obtained by reacting 1 mol of boric acid with from 1 to 2 mols of one or more polyhydric alcohols having at least 5 vicinal OH-groups, per boron atom, for example, glycerine, sorbitan and mannitol. From 1 to 40 mols of ethylene oxide, based on 1 mol of borate, which is obtained, are then added in the presence of aprotic Lewis acids such that the average degree of polymerisation of the ethylene oxide radical in the end product is from 1 to 40. The product resulting from this reaction is reacted with a carboxylic acid having from 8 to 22 carbon atoms. The following are included as carboxylic acids, for example, capric acid, lauric acid, palmitic acid, stearic acid and oleic acid.

Suitable boron compounds containing a monoester of a fatty acid, as surface-active substances for magnetic dispersions are, for example, glycerine borate laurate, glycerine borate palmitate, glycerine borate stearate, glycerine borate isostearate, glycerine borate oleate and glycerine borate hydroxystearate. Suitable boron compounds containing a di-ester of a fatty acid are, for example, glycerine borate di-oleate and glycerine borate di-stearate.

Of the boron compounds which contain a monoester of a fatty acid and polyethylene oxide, the following, for example, are suitable: polyoxyethylene glycerine borate laurate, polyoxyethylene glycerine borate palmitate, polyoxyethylene glycerine borate stearate, polyoxyethylene glycerine borate oleate and polyoxyethylene glycerine borate isostearate, while similar boron compounds which contain a di-ester of a fatty acid are, for example, polyoxyethylene glycerine borate di-stearate, -di-oleate and polyoxyethylene glycerine borate di-oleate.

The magnetic particles used for the production of a magnetic dispersion may include $\gamma$-$Fe_2O_3$, $Fe_3O_4$, cobalt-doped $\gamma$-$Fe_2O_3$, cobalt-doped $Fe_3O_4$, $CrO_2$, Fe or Fe-alloys, such as Fe-Co and Fe-Ni, which are preferably used as acicular particles having a length-to-width-ratio of from 1:10 to 1:3.

The binders known for the production of magnetic layers may be used as binders for the magnetic particles, for example, copolymers of vinyl chloride, vinyl acetate and vinyl alcohol, polyvinylacetates, copolymers of vinylidene chloride and acrylonitrile or polyurethanes, polycarbonates, phenoxy resins or epoxy resins.

Lubricants must be added before coating in order to achieve a uniform and low-friction running of the magnetic recording media. Substances which are suitable for this purpose include, among others, fatty acids, fatty acid esters, polysiloxanes, squalene, polyethylene, polyoxyethylene, liquid paraffins, $MoS_2$ or graphite. If the fatty acids or the polyoxyethylene are chemically linked to boron by a polyhydric alcohol, as, for example, in German Offenlegungsschrift No. 2,341,168, the sliding effect is reduced compared to free fatty acids or to polyoxyethylene.

This is noticeable when the surface friction of a magnetic layer is measured. In such a test, a magnetic tape cut in $\frac{1}{2}''$-width is drawn at a rate of 5 cm s$^{-1}$ on the layer side over a steel cylinder having a diameter of 100 mm and a surface roughness of $R_a=0.25$ μm. The friction coefficient μ is calculated according to the following relationship:

$$\mu = 1/\pi \ln F_2/F_1$$

wherein
$F_1$=frictional force without friction body (const.)
$F_2=F_1+$ friction of the cylinder.

The magnetic powder is mixed with one or more of the boron compounds described in a suitable quantity of solvent and then ground intensively in a sand or ball mill. After grinding, the dissolved binder and lubricant are admixed. The magnetic dispersion is then applied to a non-magnetic support which may consist, for example, of polyethylene terephthalate, polypropylene, polyvinyl acetate or polycarbonate.

The present invention will now be described with reference to the following Examples.

The orientability of the particles, the modulation noise and the sensitivity at 10 kHz are considered as qualitative features of the dispersion.

EXAMPLE 1

A magnetic lacquer is prepared from the following components in the quantities specified:
Fe-Ni alloy 100 parts, by weight
Glycerine borate oleate 4 parts, by weight
partially hydrolysed copolymer of vinyl chloride and vinyl acetate 5 parts, by weight
Polyester-polyurethane 15 parts, by weight
Stearic acid 2 parts, by weight
Cyclohexanone 150 parts, by weight
Tetrahydrofuran 150 parts, by weight The metal pigment is mixed intensively with 75 parts, by weight, of THF, 75 parts, by weight, of cyclohexanone and glycerine borate oleate and ground in a sand mill. After grinding, the dissolved copolymer, the dissolved polyester-polyurethane resin and the stearic acid are mixed with the magnetic dispersion which is then coated in known manner onto a support of polyethylene terephthalate which was cut to a suitable width.

The following properties are measured: the orientation of the particles $M_R/M_S$ (quotient from the remanent magnetization density and the saturation magnetization density at 318 A/cm, the modulation noise and the sensitivity at 10 kHz.

EXAMPLE 2

The process described in Example 1 was repeated, but using polyoxyethylene glycerine borate oleate.

EXAMPLES 3, 4 and 5

The process described in Example 1 was repeated, but using a mixture of glycerine borate oleate with a conventional dispersing agent in a weight ratio of 1:1. In Example 3, a mixture with pure lecithin was used, in Example 4, a mixture with a polyoxyethylene phosphoric acid ester and in Example 5 a mixture with dioctyl sulphosuccinate.

COMPARATIVE EXAMPLES 6 and 7

Instead of the compounds according to the present invention which were used in Examples 1 and 2, in the comparative Example 6, a mixture of a primary and secondary phosphoric acid esters of the reaction product of an alkylphenol with polyethylene glycol was used and in Comparative Example 7, pure lecithin extracted with acetone was used.

COMPARATIVE EXAMPLE 8

100 parts, by weight, of the Fe-Ni alloy were ground in a sand mill with 75 parts, by weight, of THF and 75 parts, by weight, of cyclohexanone. After grinding, 5 parts, by weight, of a partially hydrolysed copolymer of vinyl chloride and vinyl acetate, 15 parts, by weight, of a polyester-polyurethane resin and 2 parts, by weight, of glycerine borate oleate were added. The thus-obtained mixture is applied in known manner to a support of polyester and is cut to a suitable tape width.

COMPARATIVE EXAMPLE 9

100 parts, by weight, of Fe-Ni alloy were ground in a sand mill with 75 parts, by weight, of THF and 75 parts, by weight, of cyclohexanone and 4 parts, by weight, of lecithin extracted with acetone. After grinding, 5 parts, by weight, of a partially hydrolysed copolymer of vinyl chloride and vinyl acetate, 15 parts, by weight, of a polyester-polyurethane resin and 2 parts, by weight, of glycerine borate oleate were added. Further processing was carried out as described in Comparative Example 8.

|  | $M/M_{4000}$ | Modulation noise | Sensitivity at 10 kHz | Friction Coefficient μ |
|---|---|---|---|---|
| Example 1 | 0.86 | +5 dB | +3 dB | 0.29 |
| Example 2 | 0.85 | +4 dB | +3 dB | 0.29 |
| Example 3 | 0.84 | +4 dB | +3 dB | |
| Example 4 | 0.83 | +2 dB | +3 dB | |
| Example 5 | 0.83 | +3 dB | +3 dB | |
| Comparative Example 6 | 0.79 | ±0 dB | ±0 dB | |
| Comparative Example 7 | 0.79 | −2 dB | −1 dB | |
| Comparative Example 8 | 0.62 | — | — | 0.40 |
| Comparative Example 9 | 0.79 | ±0 dB | ±0 dB | 0.38 |

The Table shows that when the organic boron compounds alone are added (Examples 1 and 2) or when they are added in admixture with known dispersing agents (Examples 3 to 5) to the grinding operation, an outstanding degree of dispersion is achieved, proved by the magnetic and electroacoustic data which greatly decrease when the boron compounds are only added before pouring (Examples 8 to 9). The low orientability shows that in the latter Examples there has not been adequate dispersion. Moreover, upon adding the boron compounds to the grinding operation, a more favourable friction coefficient in the finished magnetic tape, i.e. improved running characteristics, is achieved compared to when boron compounds instead of free fatty acids are added before coating of the magnetic lacquer onto the substrate.

We claim:

1. A process for the production of a magnetic lacquer for a magnetic storage medium comprised of metal powder magnetic pigments prepared by grinding and mixed in dispersion containing binders
   which includes the step of,
   adding the metal powder magnetic pigment prior to the completion of the grinding of an organic boron compound prepared by either
   reacting boric acid
   first with polyhydric alcohols having a total of 5 to 11 neighbouring OH groups per boron atom, and
   second with polyethylene oxide in a mol ratio of 1:40, based on 1 mol of borate product
   then third with a carboxylic acid having from 8 to 18 carbon atoms.
   or reacting boric acid
   first with polyhydric alcohols having a total of 5 to 11 neighbouring OH groups per boron atom, and
   then with a carboxylic acid having 8 to 18 carbon atoms,
   said boron compound being added in 3-12 parts, by weight based on 100 parts by weight of metal powder magnetic pigments
   and then, after said addition and completion of the grinding,
   mixing the ground pigments and additive with polymeric binder selected from the group consisting of copolymers of vinyl chloride, vinyl acetate and vinyl alcohol, polyvinylacetates;
   copolymers of vinylidene chloride and acrylonitrile;
   and polyurethanes, polycarbonates, phenoxy resins and epoxy resins.

2. A process according to claim 1, characterised in that the boron compound is glycerine borate oleate.

3. A process according to claim 1, characterised in that the boron compound is a polyoxyethylene glycerine borate oleate.

4. A process according to claim 1, characterized in that the boron compound is an ($\gamma$-oleyl-glyceryl, $\alpha'$, $\beta'$-$\gamma$-polyoxyethylene glyceryl $\alpha'$, $\beta'$)-borate.

5. A process according to claims 1, 2, 3 or 4 characterised in that from 3 to 6 parts, by weight, of the boron compound, in each case based on 100 parts, by weight, of the corresponding magnetic pigment are added.

6. A process according to claims 1, 2, 3 or 4 characterised in that a metal powder which consists essentially of iron is used as the magnetic pigment.

7. A process according to claims 1, 2, 3 or 4 characterised in that $Fe_3O_4$ is used as the magnetic pigment.

8. A process according to claims 1, 2, 3 or 4 characterised in that Co-doped $Fe_3O_4$ is used as the magnetic pigment.

9. A process according to claims 1, 2, 3 or 4 characterised in that $CrO_2$ is used as the magnetic pigment.

10. A process according to claims 1, 2, 3 or 4 characterised in that $Fe_2O_3$ is used as the magnetic pigment.

11. A process for the production of a magnetic lacquer for a magnetic storage medium comprised of metal powder magnetic pigments prepared by grinding and mixed in dispersion containing binders
    which includes the step of,
    adding to the metal powder pigment prior to the completion of the grinding of an organic boron compound prepared by either
    reacting boric acid
    first with polyhydric alcohols having a total of 5 to 11 neighbouring OH groups per boron atom, and
    second with polyethylene oxide in a mol ratio of 1:40, based on 1 mol of borate product
    then third with a carboxylic acid having from 8 to 18 carbon atoms,
    or reacting boric acid
    first with polyhydric alcohols having a total of 5 to 11 neighbouring OH groups per boron atom, and
    then with a carboxylic acid having from 8 to 18 carbon atoms,
    said boron compound being added in 3—12 parts, by weight based on 100 parts by weight of magnetic pigments
    and then, after said addition and completion of the grinding,
    mixing the ground pigments and additive with polymeric binder consisting of a major part of polyester-polyurethane and a copolymer of vinyl chloride and vinylacetate.

* * * * *

UNITED STATES PATENT AND TRADEMARK OFFICE
CERTIFICATE OF CORRECTION

PATENT NO. : 4,465,608
DATED : August 14, 1984
INVENTOR(S) : Johannes Gerum et al It is certified that error appears in the above-identified patent and that said Letters Patent is hereby corrected as shown below:

Cover page at "[19]" the name "Gerüm" should read -- Gerum --.

Cover page at "[75] Inventors" the name "Gerüm" should read -- Gerum --.

Cover page, under the head "[57] ABSTRACT" in line 9 of the ABSTRACT "the" should read -- then --.

Column 1, line 54 "eacting" should read -- reacting --.

Signed and Sealed this

Nineteenth Day of February 1985

[SEAL]

Attest:

DONALD J. QUIGG

Attesting Officer  Acting Commissioner of Patents and Trademarks